(12) United States Patent
Cuvillier et al.

(10) Patent No.: US 11,453,331 B2
(45) Date of Patent: Sep. 27, 2022

(54) TRIM ELEMENT COMPRISING TWO INDEPENDENT BACKLIT AREAS

(71) Applicant: FAURECIA INTERIEUR INDUSTRIE, Nanterre (FR)

(72) Inventors: Christophe Cuvillier, Saint Ouen l'Aumône (FR); François Perrin, Le Port Marly (FR); Armand Brousselle, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/307,980

(22) Filed: May 4, 2021

(65) Prior Publication Data

US 2021/0347296 A1 Nov. 11, 2021

(51) Int. Cl.
*B60Q 3/14* (2017.01)
*B60Q 3/217* (2017.01)
(Continued)

(52) U.S. Cl.
CPC .......... *B60Q 3/14* (2017.02); *B29D 11/00663* (2013.01); *B60Q 3/217* (2017.02); *B60R 13/0243* (2013.01); *B60R 13/0256* (2013.01); *G02B 6/0035* (2013.01); *G02B 6/0055* (2013.01); *G02B 6/0078* (2013.01); *B29L 2031/302* (2013.01); *B60Q 1/2665* (2013.01); *B60Q 3/258* (2017.02); *B60Q 3/60* (2017.02); *B60Q 3/62* (2017.02); *B60Q 3/64* (2017.02); *B60Q 3/66* (2017.02); *B60Q 3/68* (2017.02);
(Continued)

(58) Field of Classification Search
CPC . B60Q 3/14; B60Q 3/258; B60Q 3/60; B60Q 3/62; B60Q 3/64; B60Q 3/66; B60Q 3/68; B60Q 1/2665; F21V 7/0008; F21V 7/0033; F21V 7/0041; F21Y 2109/00
See application file for complete search history.

(56) References Cited

U.S. PATENT DOCUMENTS

| 8,708,536 B1* | 4/2014 | Mathieu | G02B 19/0023 362/494 |
| 2004/0145902 A1* | 7/2004 | Todd | B60Q 1/2665 362/494 |

(Continued)

FOREIGN PATENT DOCUMENTS

| DE | 102016215763 A1 | 3/2017 |
| DE | 102018207071 A1 | 11/2019 |

(Continued)

OTHER PUBLICATIONS

French Search Report corresponding to French Application No. FR 2004422, dated Jan. 15, 2021, 2 pages.

*Primary Examiner* — Colin J Cattanach
(74) *Attorney, Agent, or Firm* — Reising Ethington P.C.

(57) ABSTRACT

A trim element having a coating layer defining an outer surface and an inner surface, the coating layer including at least two distinct backlit pattern areas separated by at least one opaque area preventing the passage of light from the inner surface to the outer surface. The trim element includes at least one light source for each backlit pattern area, the light source being fixed on the inner surface of the coating layer facing an opaque area while being spaced apart from the corresponding backlit pattern area. The trim element has one light guide per backlit pattern area.

10 Claims, 4 Drawing Sheets

(51) Int. Cl.

| | |
|---|---|
| *B29D 11/00* | (2006.01) |
| *B60R 13/02* | (2006.01) |
| *F21V 8/00* | (2006.01) |
| *B29L 31/30* | (2006.01) |
| *B60Q 1/26* | (2006.01) |
| *B60Q 3/62* | (2017.01) |
| *B60Q 3/68* | (2017.01) |
| *B60Q 3/64* | (2017.01) |
| *B60Q 3/66* | (2017.01) |
| *B60Q 3/60* | (2017.01) |
| *B60Q 3/258* | (2017.01) |
| *F21Y 109/00* | (2016.01) |
| *F21V 7/00* | (2006.01) |

(52) U.S. Cl.
CPC ..... *B60R 2013/0287* (2013.01); *F21V 7/0008* (2013.01); *F21V 7/0033* (2013.01); *F21V 7/0041* (2013.01); *F21Y 2109/00* (2016.08)

(56) References Cited

U.S. PATENT DOCUMENTS

2005/0134953 A1* 6/2005 Mathieu ................ B60R 1/1207
359/265
2006/0291225 A1* 12/2006 Todd .................... B60Q 1/2665
362/494

FOREIGN PATENT DOCUMENTS

| KR | 101804311 B1 * | 12/2017 | ........... G02B 6/0066 |
| WO | WO-0025064 A1 * | 5/2000 | ........... B60R 1/1207 |
| WO | 2020193135 A1 | 10/2020 | |
| WO | WO-2020193135 A1 * | 10/2020 | ............. B60K 37/06 |

\* cited by examiner

TRIM ELEMENT COMPRISING TWO INDEPENDENT BACKLIT AREAS

TECHNICAL FIELD

The present invention relates to a vehicle trim element of the type comprising a coating layer defining an outer surface and an inner surface, opposite to the outer surface, the said coating layer comprising at least two distinct backlit pattern areas, wherein the said coating layer is at least partially translucent so as to allow light to pass from the inner surface to the outer surface, the said backlit pattern areas being separated by at least one opaque area preventing the passage of light from the inner surface to the outer surface, the said trim element further comprising at least one light source for each backlit pattern area, the said light source being attached to the inner surface of the coating layer facing an opaque area and being spaced apart from the corresponding backlit pattern area.

The invention also relates to a method for producing such a trim element.

BACKGROUND

It is known to provide backlit areas on the outer surface of a trim element in order to illuminate patterns, such as pictograms or decorative patterns, on this outer surface.

For this purpose, the coating layer includes translucent areas presenting the shape of the patterns to be displayed and light sources are arranged opposite these translucent areas on the inner side of the coating layer in order to illuminate the translucent areas. To ensure good illumination of the backlit areas, the light sources are arranged in "light boxes" extending between the light sources and the backlit areas. The walls of the lightboxes are reflective so that the light rays from the light source are transmitted to the backlit areas by the lightbox.

However, in order to ensure good diffusion of the light when it reaches the outer surface of the trim element, it is necessary to provide a certain distance between the light source and the backlit areas, which increases the thickness of the trim element and the space required.

To overcome this disadvantage, it has been proposed to place the light source against the inner surface of the trim element and to guide the light to the backlit areas by light guides.

However, the quality of the light reaching the backlit areas is then unsatisfactory.

SUMMARY

The invention is intended to overcome these disadvantages by providing a trim element comprising backlit pattern areas with satisfactory illumination characteristics.

For this purpose, the invention relates to a trim element of the above-mentioned type, further comprising one light guide per backlit pattern area, each light guide extending on the inner surface of the coating layer between a light source and the corresponding backlit pattern area so as to transmit the light emitted by the said light source to the said backlit pattern area, the light guides being distinct and separate from each other.

By providing one light guide per pairs formed by a light source and a backlit pattern area, it is ensured that light from one light source illuminates only the corresponding backlit pattern area and does not scatter to another backlit pattern area. This ensures a clearly defined display of each of the backlit pattern areas, even when they are very close together.

Various embodiments of the invention may include on or more of the following other optional features of the trim element, taken alone or in any technically feasible combination:
- the distance between each light source and the corresponding backlit area, measured along the inner surface of the coating layer, is comprised between 6 mm and 12 mm.
- each light guide is coated with a reflective material;
- a layer of reflective material extends on the inner surface of the coating layer around at least a portion of each light source, the said layer of reflective material extending at least between the light source and the corresponding backlit area.
- the trim element comprises a support, the said support extending on the inner surface of the coating layer around the light guides and separating the said light guides from each other.
- each light guide comprises a guide surface extending substantially parallel to the inner surface of the coating layer between the light source and the corresponding backlit pattern area and an inclined surface extending opposite the corresponding backlit pattern area and forming an angle with the inner surface of the coating layer and with the guide surface, the said inclined surface being arranged to direct light from the light source towards the corresponding backlit pattern area.
- each light guide comprises a guide surface extending substantially parallel to the inner surface of the coating layer between the light source and the corresponding backlit pattern area and a curved surface extending opposite the corresponding backlit pattern area, the said curved surface being curved between the guide surface and the inner surface of the coating layer, the said curved surface being arranged to direct light from the light source to the corresponding backlit pattern area; and
- at least one electrical connection circuit for the light source is made on the inner surface of the coating layer opposite each light source, each light source being electrically connected to a corresponding connection circuit.

According to another aspect, the invention relates to a method for producing a trim element as described above, comprising the following steps:
- forming a coating layer comprising at least two distinct backlit pattern areas, wherein the said coating layer is at least partially translucent so as to allow light to pass from the inner surface to the outer surface, the said backlit pattern areas being separated by at least one opaque area preventing the passage of light from the inner surface to the outer surface,
- attaching at least two light sources to the inner surface of the coating facing an opaque area away from the corresponding backlit pattern area,
- making at least two light guides so that each light guide extends on the inner surface of the coating layer between a light source and a corresponding backlit pattern area, wherein the light guides are realized independently of each other so that the resulting light guides are distinct and separate from each other.

According to another optional feature of the producing method, each light guide is manufactured by injection molding, the material forming each light guide being injected through an injection point, the said injection point being remote from the light source and extending opposite the corresponding backlit pattern area.

BRIEF DESCRIPTION OF THE DRAWINGS

Other aspects and advantages of the invention will appear when reading the following description, given as an example, and made with reference to the appended drawings, in which.

DETAILED DESCRIPTION

Figure 1:
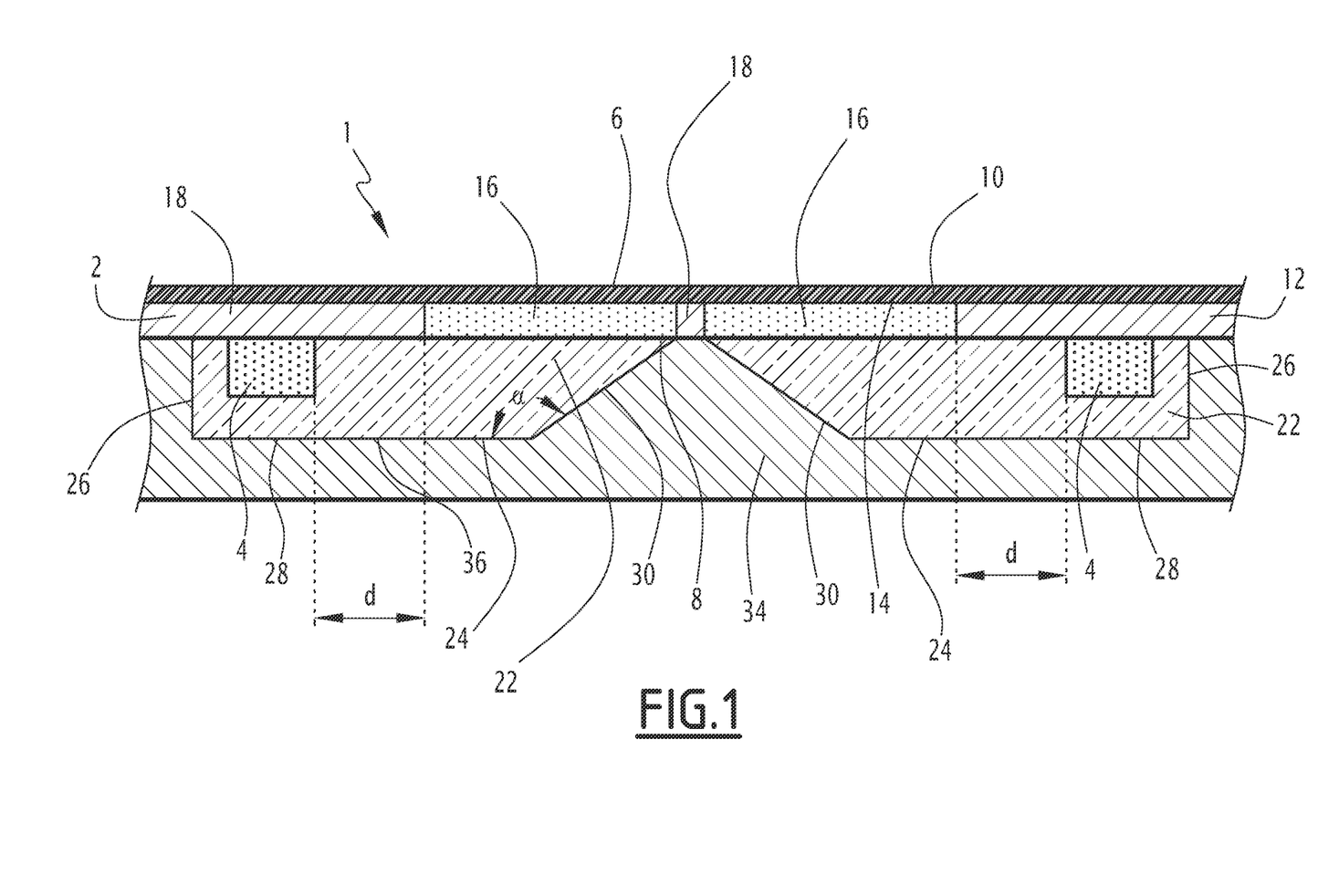
FIG. 1 is a schematic sectional representation of a part of a trim element according to one embodiment of the invention.

With reference to FIG. 1, a vehicle trim element 1 is described comprising a coating layer 2 and at least two light sources 4. Such a trim element 1 forms, for example, all or part of a door panel, a center console, a vehicle dashboard, or the like.

The coating layer 2 comprises an outer surface 6, forming at least part of the visible surface of the trim element 1, and an inner surface 8, opposite to the outer surface 6 and extending inwardly from the trim element 1. Thus, the outer surface 6 provides the appearance to at least a portion of the trim element 1, while the inner surface 8 is intended to face the portion of the vehicle on which the trim element 1 is to be installed. The coating layer 2 may consist of several layers. According to the embodiment shown in the figures, the coating layer 2 includes at least one appearance layer 10, defining the outer surface 6 of the coating layer 2, and a functional layer 12, defining the inner surface 8 of the coating layer 2.

The appearance layer 10 is for example substantially continuous and covers all or part of the trim element 1. Opposite the outer surface 6, the appearance layer 10 comprises a back surface 14 on which the functional layer 12 extends. The appearance layer 10 is for example substantially translucent, i.e., it allows light to pass from the back surface 14 to the outer surface 6. Translucent is defined as a light transmission rate comprised between 5% and 100%, with 100% corresponding to a transparent layer. The translucency of the appearance layer 10 can be given either by the material forming the appearance layer 10 or by its thickness. Alternatively, only certain areas of the appearance layer 10 are translucent, for example, by making perforations in the appearance layer 10 in these areas. The appearance layer 10 is for example formed by a skin that can be made of any suitable material, such as a plastic material, a ligneous material, or other material. Alternatively, the appearance layer 10 can be a simple varnish layer applied over the functional layer 12.

The functional layer 12 extends over the back surface 14 of the appearance layer 10 and comprises at least two backlit pattern areas 16 and at least one opaque area 18. The functional layer 12 is made of plastic materials such as polycarbonate (PC), polyethylene terephthalate (PET), polymethyl methacrylate (PMMA) or polycarbonate/polymethyl methacrylate (PC/PMMA). The functional layer, for example, presents a thickness of approximately 0.175 mm to 2 mm.

Each backlit pattern area 16 is at least partially translucent, or even transparent, so that light can pass through the functional layer 12 from the inner surface 8 to the appearance layer 10 in the translucent part(s) of the backlit pattern area. Each backlit pattern area 16 is arranged opposite a translucent area of the appearance layer 10, so that the light passing through the backlit pattern area 16 is transmitted to the outer surface 6 of the coating layer 2 so that it is visible from the outside of the trim element 1. Each backlit pattern area 16 can have any desired shape depending on what is to be displayed on the outer surface 6 of the coating layer 2. Thus, a backlit pattern area 16 presents, for example, the shape of a pictogram or pattern to be displayed. A backlit area can be completely translucent. Alternatively, within a backlit pattern area, translucent and opaque portions can be provided to define the shape to be displayed on the outer surface 6 of the coating layer 2.

The shape of the backlit pattern areas 16 may differ from one backlit pattern area 16 to another. The coating layer 2 may have more than two backlit pattern areas 16, depending on what is to be displayed on the outer surface 6 of coating layer 2.

The opaque area 18 is arranged to prevent light from passing from the inner surface 8 to the appearance layer 10 through the opaque area 18. Opaque means a light transmission rate of less than 5%, preferably close to or equal to 0%. This opacity is obtained by the material used to make the opaque zone 18 and/or by the thickness of the functional layer 12. The opaque area 18 extends at least between the backlit pattern areas 16 so as to separate them. Separation means that the backlit pattern areas 16 do not communicate with each other so that light passing through one backlit pattern area 16 is not transmitted to another backlit pattern area 16. As will be described later, the backlit pattern areas 16 can be brought close together, while being separated by an opaque area 18. The term "close together" means that the distance between two backlit pattern areas is, for example, close to 1 mm or more. As shown in the figures, the opaque area 18 can also extend around the backlit pattern areas 16. Multiple opaque areas 18 can be provided, for example, when a backlit area 16 extends over an entire portion of the trim element 1 and requires an interruption of the opaque area 18.

The backlit pattern areas 16 can be achieved by forming openings in the opaque area 18, with the shape of the openings defining the shape of the backlit area 16. In this case, when a backlit pattern area 16 is fully translucent, it is formed by a single opening in the opaque area, with the opening presenting the shape of the desired backlit pattern area. When a backlit pattern area 16 comprises both translucent and opaque portions, it is formed by a plurality of openings in the opaque area 18, each opening presenting the shape of one of the translucent portions of the backlit pattern area 16 and the opaque portions being formed by the opaque area 18 around these openings.

According to one embodiment, the openings are additionally filled with a light-transmitting material, such as an optical gel or other material. The openings are, for example, cut into the functional layer 12 or the functional layer is made by leaving openings in the opaque zone 18, i.e., the opaque zone 18 is applied to the reverse surface 14 of the appearance layer 10 around the openings. In other words, the functional layer 12 forms a mask including the opaque areas 18 blocking the light and translucent areas forming at least part of the backlit pattern areas 16 of the desired shapes. The functional layer 12 is formed, for example, by printing on the reverse surface 14 of the appearance layer 10. Alternatively, it is the appearance layer 10 which is applied to the functional layer 12 as described above.

It is understood that the coating layer 2 may include further layers, as described later. Alternatively, the coating layer 2 consists of a single layer, comprising the backlit pattern areas 16 and the opaque area(s) 18, these areas extending from the inner surface 8 to the outer surface 6.

Each light source 4 is arranged to illuminate a corresponding backlit pattern area 16. Specifically, each light source 4 is arranged to illuminate only one corresponding backlit pattern area 16. Illuminating a single backlit pattern area 16 means that each light source 4 illuminates all the translucent parts of a backlit pattern area 16 when this includes both translucent and opaque portions, as described above. In other words, the same light source 4 is not used to illuminate several backlit pattern areas 16. However, it is understood that several light sources 4 may be used to illuminate the same backlit pattern area 16. Thus, the trim element has at least as many light sources 4 as there are backlit pattern areas 16 or more light sources 4 than there are backlit pattern areas 16. For example, each light source 4 is formed by a light-emitting diode emitting light in the visible range. All light sources 4 are not necessarily identical and can for example be formed by light-emitting diodes emitting light of different colors.

Each light source 4 is attached to the inner surface 8 of the coating layer 2 opposite the or to one opaque area 18 outside the backlit pattern area 16. Thus, each light source 4 does not extend opposite the corresponding backlit pattern area 16 that this light source 4 must illuminate. Therefore, it is understood that, when the backlit pattern area includes one or more opaque parts, the light source 4 is not fixed opposite one of these opaque parts. In other words, a light source 4 is spaced or offset on the inner surface 8 relative to the corresponding backlit pattern area 16. In particular, the distance d between a light source 4 and the corresponding backlit pattern area 16 is comprised between 6 mm and 12 mm, this distance being measured along the inner surface 8 of the coating layer 2. Specifically, the distance d is measured from the light emission point of the light source 4 to the point of the corresponding backlit pattern area 16 closest to the light source 4. This range of 6 mm to 12 mm ensures good quality illumination of the corresponding backlit pattern area 16 while limiting the overall volume of the light source 4 and the corresponding backlit pattern area 16, as described in more detail later.

Figure 4:
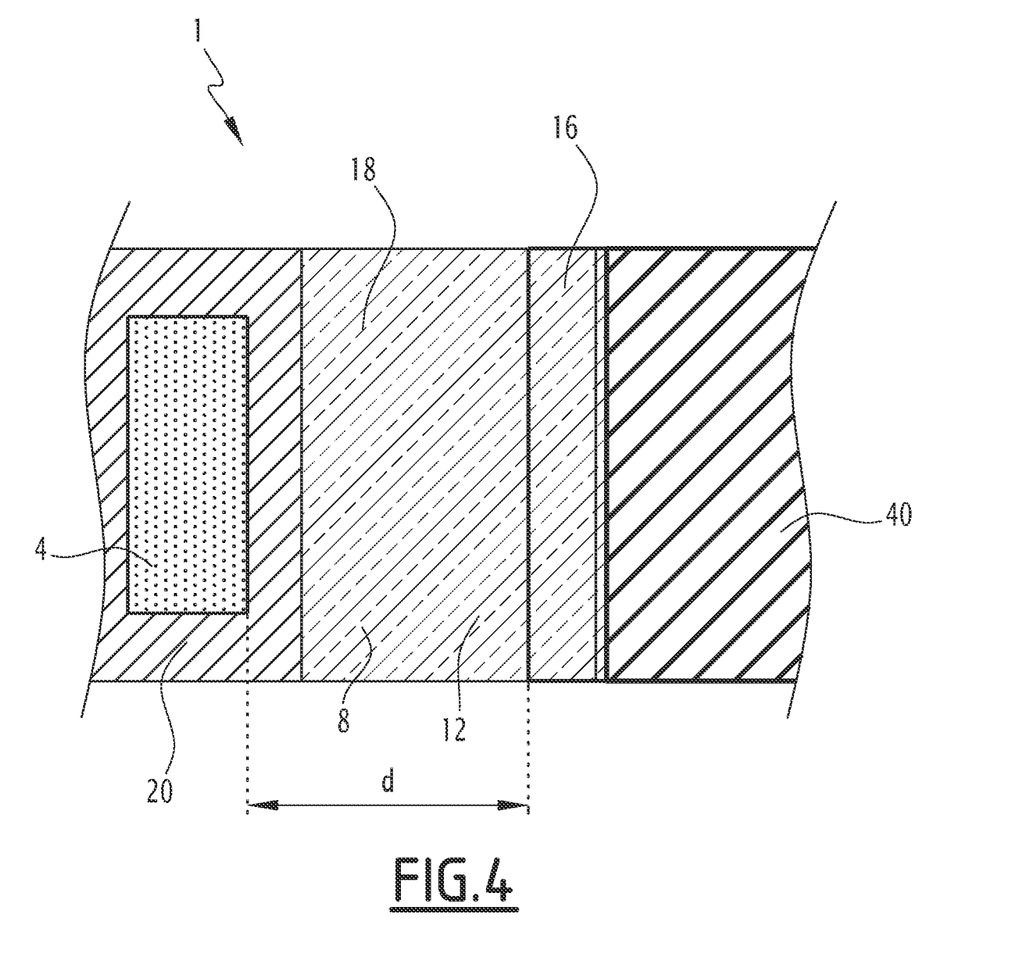
FIG. 4 is a schematic representation seen from underneath of a part of a trim element according to an embodiment of the invention.

According to an embodiment, each light source 4 is more particularly attached to an electrical connection circuit 20 (FIG. 4) created on the inner surface 8 of the coating layer 2 opposite an opaque area 18. The tracks of such an electrical connection circuit 20 are, for example, printed on the inner surface 8 of the coating layer 2 and the light source 4 is electrically connected to this electrical connection circuit 20. The tracks are for example made of conductive inks, for example, silver-based inks. The different electrical connection circuits 20, corresponding to the different light sources 4, are for example all powered by the electrical power supply of the vehicle in which the trim element 1 is installed. In this case, tracks for connecting the electrical connection circuits 20 to this power supply and for controlling the light sources 4 are also provided on the inner surface 8 of trim element 2.

A light guide 22 extends between each light source 4 and the corresponding backlit pattern area 16 so that the light emitted by the light source 4 is guided to the corresponding backlit pattern area 16 and transmitted to this area to be visible on the outer surface 6 of the coating layer 2. The light guide 22 is therefore made of a material suitable for the light transmission, such as a transparent plastic material. Such a material is, for example, polycarbonate (PC) or polymethyl methacrylate (PMMA).

Each light guide 22 extends against the inner surface 8 of the coating layer 2 and encapsulates the light source(s) 4 arranged to illuminate a particular backlit pattern area 16. Encapsulate means that the light guide 22 covers the light source(s) 4 so that all the light emitted by the light source(s) 4 is injected into the light guide 22. Each light guide 22 supplies light to only one backlit pattern area 16, meaning that all the light injected into a light guide 22 is transmitted to only one backlit pattern area 16 and there are as many light guides 22 as there are separate backlit pattern areas 16. The following description will be made for backlit pattern areas 16 each illuminated by a single light source 4.

Each light guide 22 is isolated and distinct from the others, i.e., there is no light communication between two light guides 22. In other words, the light emitted by a light source 4 in a light guide 22 remains inside this light guide 22 up to the corresponding backlit pattern area 16 and is not transmitted to another light guide 22.

Figure 2:
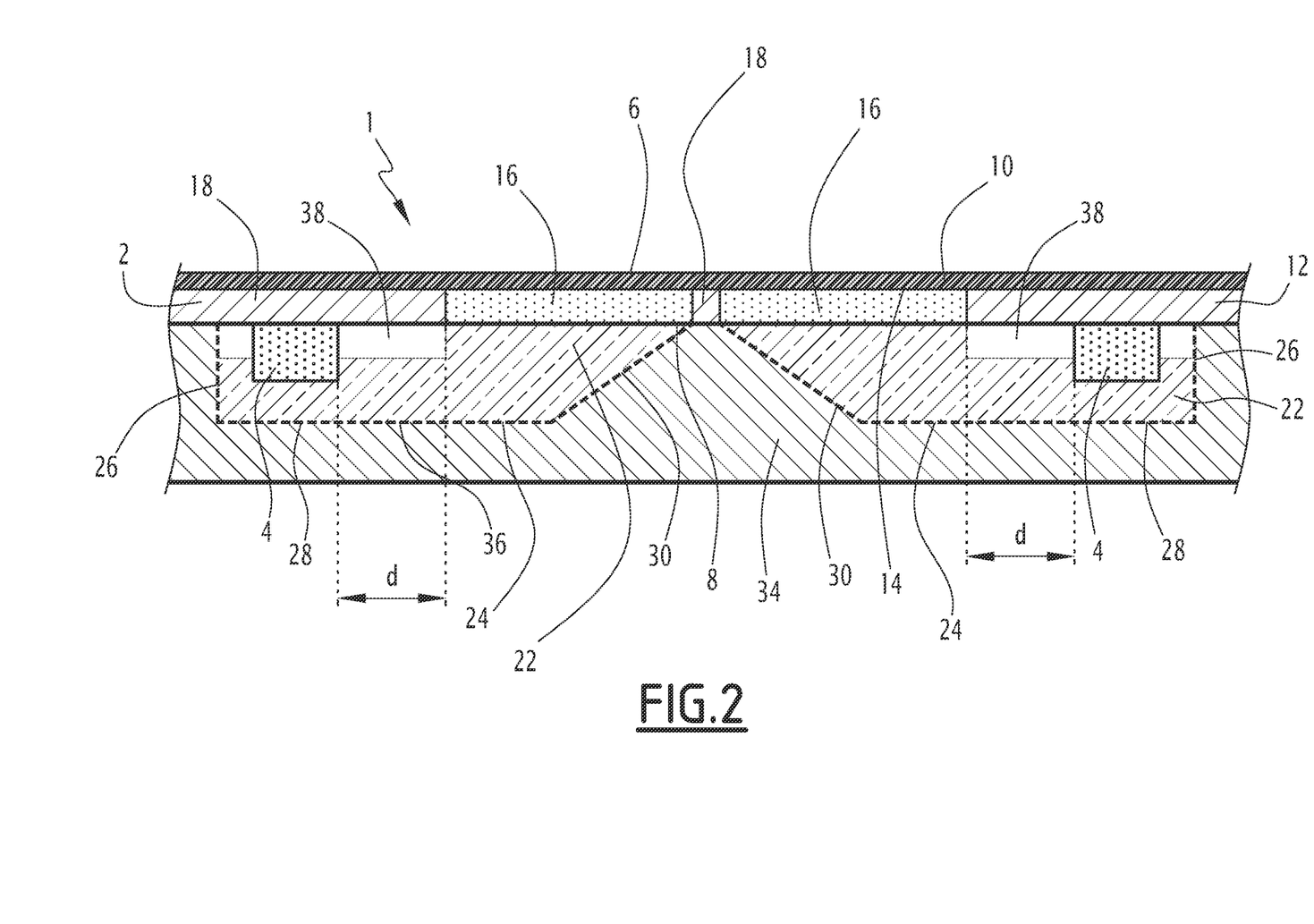
FIG. 2 is a schematic sectional representation of a part of a trim element according to another embodiment of the invention.
Figure 3:
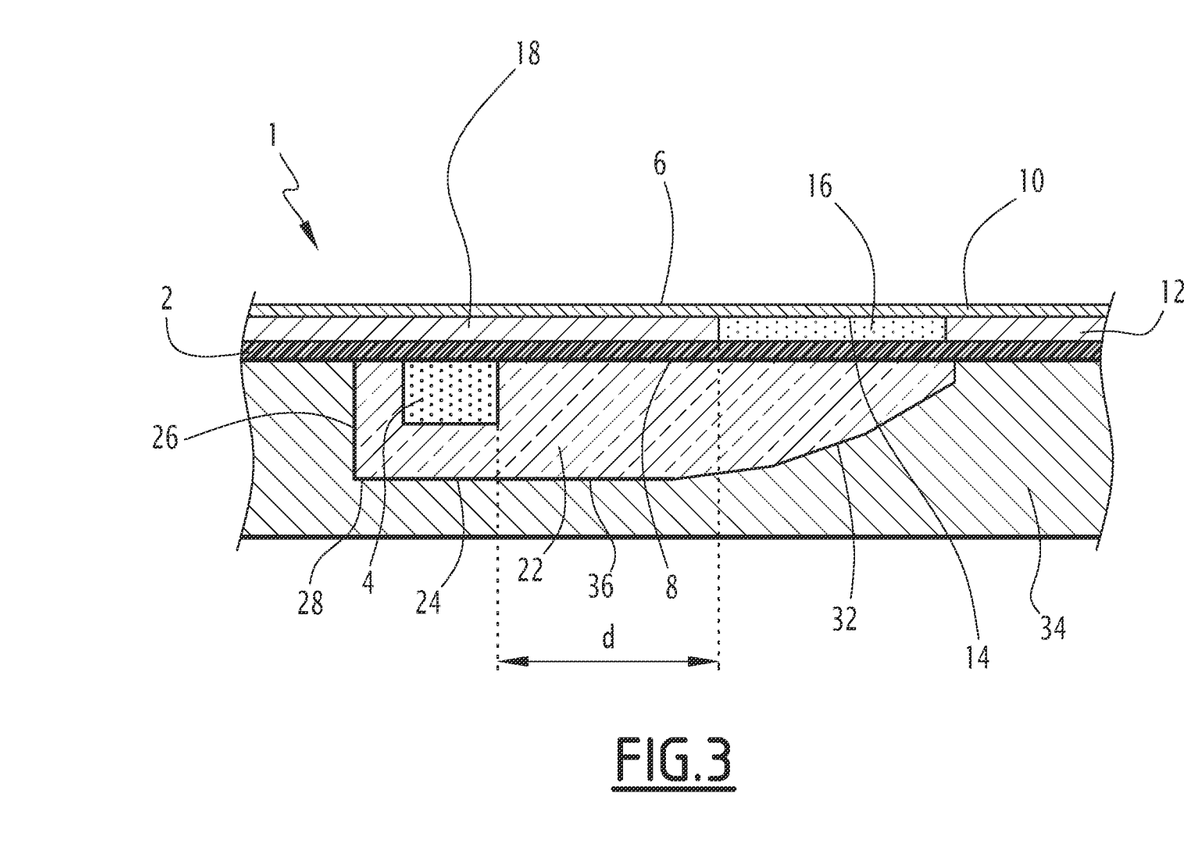
FIG. 3 is a schematic sectional representation of a part of a trim element according to yet another embodiment of the invention.

Each light guide 22 is delimited by the portion of the inner surface 8 against which it extends, by side walls projecting from the inner surface 8 of the coating layer 2 around the light source 4 and by a guide wall 24 extending opposite the inner surface 8 of the coating layer 2 and joining the side walls opposite the inner surface 8. More particularly, among the side walls, the light guide 22 comprises a back wall 26 extending opposite the light source 4 on the side of the light source 4 furthest from the corresponding backlit area 16. The guide wall 24 extends from the back wall 26 to one end of the corresponding backlit pattern area extending on the side of the backlit area 16 furthest from the light source 4, as shown in FIGS. 1 to 3. In other words, the guide wall 24 completely covers the portion of the inner surface 8 of the coating layer 2 that includes the light source 4 and the corresponding backlit pattern area 16.

In particular, the guide wall 24 comprises a guide surface 28 extending substantially parallel to the inner surface 8 of the coating layer 2 and an inclined surface 30 (FIGS. 1 and 2) or a curved surface 32 (FIG. 3) joining the guide surface 28 to the inner surface 8 of the coating layer 2. The guide surface 28 extends opposite the light source 4 and a part of the corresponding backlit pattern area 16. Thus, the guide surface 28 extends from the back wall 26 to an area opposite the corresponding backlit pattern area 16.

According to the embodiment of FIGS. 1 and 2, the inclined surface 30 forms an angle α with the guide surface 28 and with the inner surface 8 of the coating layer 2 and joins the guide surface 28 and the inner surface 8. Thus, the inclined surface 30 extends from the region facing the backlit area to the edge of the backlit pattern area 16 furthest from the light source 4. The angle α is chosen so that the light rays emitted by light source 4 and incident on the inclined surface 30 are transmitted to the corresponding backlit pattern area 16 by reflection, as described later. The angle α is, for example, comprised between 135° and 170°.

According to the embodiment of FIG. 3, the curved surface 32 is curved between the guide surface 28 and the inner surface 8, with the concavity formed by the curved surface 32 being turned towards the inner surface 8 of the coating layer 2. Thus, the curved surface 32 extends from the region opposite the backlit pattern area to the edge of the backlit pattern area 16 furthest from the light source 4. The radius of curvature of the curved surface 32 is chosen so that the light rays emitted by the light source 4 and incident on the curved surface 32 are transmitted to the corresponding backlit pattern area 16 by reflection, as described later. The radius of curvature is for example comprised between 10 mm and 40 mm.

According to the embodiment shown in the figures, the trim element 1 also includes a support 34 extending over the inner surface 8 of the coating layer 2 and encapsulating the light guides 22. The support 34 is designed to provide its rigidity and shape to the trim element 1, among other things. The coating layer 2 follows in particular, the shape of the outer surface of the support 34. "Encapsulating the light guides 22" means that the light guides 22 extend completely inside the support 34 and that the support 34 covers the side walls and the back wall 24 of the light guide 22. The support 34 also extends between the light guides 22 and separates the light guides 22 from each other.

According to one embodiment, each light guide 22 is additionally coated with a reflective material 36 arranged to reflect the light rays from the light source 4 encapsulated by the light guide and incident on one of the walls of the light guide 22. The reflected light rays are more particularly directed to the corresponding backlit area 16, in particular through the inclined surface 30 or the curved surface 32. The reflective material 36 has for example a reflection rate of 75% or more.

The reflective material 36 is, for example, formed by a reflective layer applied to the walls of each light guide 22, if needs be, between the light guide 22 and the support 34, as shown in dotted lines in FIG. 2. According to another embodiment, the support 34 is directly made of a reflective material 36 so that the reflective material encapsulates the light guides 22. Thus, all light rays emitted by a light source 4 and directed towards the walls of the light guide 22 in which this light source 4 is placed are reflected and directed to the corresponding backlit area 16 and reach the outer surface 6 of the coating layer 2 by passing through the backlit area 16.

According to one embodiment and as shown in FIG. 2, a layer of reflective material 38 is applied to the inner surface 8 of the coating layer around each light source 4 opposite the guide surface 28 of the light guide 22. In particular, the reflective material layer 38 extends at least between the light source 4 and the corresponding backlit pattern area 16. The reflective material layer 38 can also extend between the light source 4 and the side walls of the light guide 22. Thus, all light rays emitted by a light source 4 and directed to the inner surface 8 of the coating layer around the corresponding backlit pattern area 16 are reflected by the reflective material layer 38 and directed to the walls of the light guide 22 from where they are guided to the corresponding backlit area 16, as described above. The reflective material layer 38, for example, presents a reflection rate of 75% or more.

The guide element 22 and the distance between the light source 4 and the corresponding backlit pattern area 16 ensure a good quality display on the outer surface 6 of the coating layer 2. Indeed, by isolating each of the light guides 22 from the others, it is ensured that the light rays of a light source 4 remain concentrated within a single light guide 22 and that there is no scattering to other light guides or into the support 34. In addition, by providing a distance greater than or equal to 6 mm between the light source 4 and the corresponding backlit pattern area 16, it is ensured that the light emitted by the light source 4 is diffused when it reaches the outer surface 6 of the coating layer 2 through the backlit pattern area 16, especially after reflection from the inclined surface 30 or the curved surface 32. Indeed, the reflections inside the light guide 22 lengthen the path of the light rays between the light source 4 and the outer surface 6, thus diffusing the light. The trim element 1 can thus remain relatively thin because the light source 4 is arranged against the inner surface 8 of the coating layer 2 while at the same time presenting satisfactory illumination of the backlit pattern areas 16. Thus, for example, the trim element 1 may present a minimum thickness of 4.5 mm, measured from the inner surface of the support 34 to the outer surface 6 of the coating layer 6, whereas this thickness is generally close to 15 mm in the case of a light source arranged opposite the backlit area by this light source. By providing that the distance between the light source 4 and the corresponding backlit pattern area 16 is less than or equal to 12 mm, it is ensured that the space requirement for a light guide 22 remains limited and, in particular, allows a large number of backlit pattern areas 16 adjacent to each other. As an example, the trim element 1 may present backlit pattern areas 16 with a distance of 1 mm between them, as described above.

Note that in FIGS. 1 and 2, two light guides 22 illuminating two adjacent backlit pattern areas 16 have been shown to extend according to opposite directions. It is understood that this representation is shown only as an example and that the light guides 22 could extend according to the same direction by being side by side. The light guides 22 could also extend according to different directions depending on the space available under the coating layer 2 and the arrangement of the backlit pattern areas 16 relative to each other.

A method for producing a trim element 1 as described above will now be described.

The coating layer 2 is first produced with one or more layers and with at least partially translucent backlit pattern areas 16 and at least one opaque area 18 extending between and around the backlit pattern areas 16. The electrical connection circuits 20 are then made on the inner surface 8 of the coating layer 2, for example, by printing, opposite an opaque area 18 where the light sources 4 are to be arranged. The tracks for connecting the electrical connection circuits 20 are also made.

According to an embodiment, the reflective material layers 38 are then applied to the inner surface 8 of the coating layer 2 around the connection points of each light source 4. The layers of reflective material 38 can also be printed on the inner surface 8 of the coating layer 2 and/or on the electrical connection circuits 20.

The light sources 4 are then attached to the electrical connection circuits 20 and electrically connected to these circuits.

The light guides 22 are realized on the inner surface 8 of coating layer 2 in such a way that the light sources 4 are encapsulated and associated with the corresponding backlit pattern areas 16. The light guides 22 are, for example, produced on the inner surface 8 of the coating layer 2 by injection molding, the material forming the light guides 22 on the inner surface 8 of the coating layer 2. Note that, since the light guides 22 are separate and distinct from each other, the material forming each light guide 22 is injected separately from the materials forming the other light guides 22. That is, each light guide is injected individually into an injection channel that is not in fluid communication with another injection channel. In other words, the tool for making light guides 22 comprises one injection nozzle per light guide 22 and the injected material does not flow from one light guide to another. In order to prevent the injected material from degrading the connection circuit 20 and/or the reflective material layer 38 due to the pressure at which this material is injected, the injection nozzle of a light guide 22 opens into the injection channel opposite the backlit pattern area 16, rather than opposite the opaque area 18, as shown by the hatched area 40 in FIG. 4. In other words, the material is injected at a point remote from the light source 4 and the electrical connection circuit 20 so that the injected material does not damage the light source 4 and the connection circuit 20 when it flows over the area receiving these elements.

Alternatively, the light guides 22 are formed by inserts attached to the inner surface 8 of the coating layer. Alternatively, the light guides are deposited by printing or additive manufacturing, such as three-dimensional printing. Thus, for example, the light guides are produced by depositing a resin in wells formed on the inner surface 8 of the coating layer 2.

A layer of reflective material 36 is applied to the walls of the light guides 22 after the light guides 22 have been produced, before the support 34 is produced according to a production method. When the support 34 is made of reflective material, it can be applied directly to the light guides 20 and to the inner surface 8 of the coating layer 2, for example, by overmolding.

The trim element 1, thus allows backlit pattern areas to be satisfactorily illuminated with diffuse light, even when the backlit pattern areas are close together. In addition, the thickness of the trim element can be reduced so that it takes up less space.

The invention claimed is:

1. A vehicle trim element comprising a coating layer defining an outer surface and an inner surface, opposite to the outer surface, the coating layer comprising at least two distinct backlit pattern areas, wherein the coating layer allows at least some light to pass from the inner surface to the outer surface, the backlit pattern areas being separated by at least one opaque area preventing the passage of light from the inner surface to the outer surface, the trim element further comprising at least one light source for each backlit pattern area, each light source being attached to the inner surface of the coating layer at an opaque area and being spaced apart from the corresponding backlit pattern area, wherein the trim element comprises one light guide per backlit pattern area, each light guide extending on the inner surface of the coating layer between one of the light sources and the corresponding backlit pattern area so as to transmit light emitted by the light source to the backlit pattern area, the light guides being distinct and separate from each other, wherein each light guide and each backlit pattern area comprises a translucent or transparent material, and wherein each light source is attached directly against the corresponding opaque area such that there is no light communication between the separate light guides, and light emitted by one light source in one of the light guides is not transmitted to another one of the light guides.

2. The trim element according to claim 1, wherein the distance between each light source and the corresponding backlit pattern area, measured along the inner surface of the coating layer, is comprised between 6 mm and 12 mm.

3. The trim element according to claim 1, wherein each light guide is coated with a reflective material.

4. The trim element according to claim 1, wherein a layer of reflective material extends on the inner surface of the coating layer around at least a portion of each light source, the layer of reflective material extending at least between the light source and the corresponding backlit pattern area.

5. The trim element according to claim 1, further comprising a support, the support extending on the inner surface of the coating layer around the light guides and separating the light guides from each other.

6. The trim element according to claim 1 wherein each light guide comprises a guide surface extending substantially parallel to the inner surface of the coating layer between the light source and the corresponding backlit pattern area and an inclined surface extending opposite the corresponding backlit pattern area and forming an angle with the inner surface of the coating layer and with the guide surface, the inclined surface being arranged to direct the light from the light source to the corresponding backlit pattern area.

7. The trim element according to claim 1, wherein each light guide comprises a guide surface extending substantially parallel to the inner surface of the coating layer between the light source and the corresponding backlit pattern area and a curved surface extending opposite the corresponding backlit pattern area, the curved surface being curved between the guide surface and the inner surface of the coating layer, the curved surface being arranged to direct the light from the light source to the corresponding backlit pattern area.

8. The trim element according to claim 1, wherein at least one electrical connection circuit of the light source is provided on the inner surface of the coating layer facing each light source, each light source being electrically connected to a corresponding connection circuit.

9. A method for producing the trim element according to claim 1, comprising the following steps: forming the coating layer comprising the at least two distinct backlit pattern areas, attaching each of the at least two light sources to the inner surface of the coating layer directly against the corresponding opaque area away from the corresponding backlit area, and providing at least two light guides so that each light guide extends on the inner surface of the coating layer between one of the light sources and the corresponding backlit pattern area.

10. A method for producing according to claim 9, wherein each light guide is formed by injection molding, the material forming each light guide being injected through an injection point, the injection point being spaced from the light source and extending opposite the corresponding backlit pattern area.

* * * * *